(12) United States Patent  (10) Patent No.: US 7,596,514 B2
Endo et al.  (45) Date of Patent: Sep. 29, 2009

(54) COMPONENT MANAGEMENT SYSTEM AND METHOD

(75) Inventors: Koichi Endo, Tokyo (JP); Takashi Yanagimoto, Kanagawa (JP); Susumu Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/482,818

(22) Filed: Jul. 10, 2006

(65) Prior Publication Data

US 2006/0253342 A1  Nov. 9, 2006

Related U.S. Application Data

(60) Division of application No. 10/694,022, filed on Oct. 28, 2003, now abandoned, which is a continuation of application No. 09/909,902, filed on Jul. 23, 2001, now abandoned.

(30) Foreign Application Priority Data

Jul. 21, 2000  (JP) ............................. 2000-221549

(51) Int. Cl.
G06Q 30/00 (2006.01)
G06F 17/30 (2006.01)

(52) U.S. Cl. .......................................... 705/26; 705/27

(58) Field of Classification Search .................. 705/26, 705/27
See application file for complete search history.

(56) References Cited

U.S. PATENT DOCUMENTS

| 4,992,940 | A | * | 2/1991 | Dworkin ....................... 705/26 |
| 5,319,542 | A | | 6/1994 | King, Jr. et al. |
| 5,586,038 | A | | 12/1996 | Nagaoka |
| 5,822,210 | A | | 10/1998 | Kobayashi et al. |
| 6,055,516 | A | | 4/2000 | Johnson et al. |
| 6,295,513 | B1 | * | 9/2001 | Thackston ..................... 703/1 |
| 6,532,481 | B1 | * | 3/2003 | Fassett, Jr. ................... 707/203 |
| 6,615,184 | B1 | * | 9/2003 | Hicks .......................... 705/26 |
| 6,868,392 | B1 | * | 3/2005 | Ogasawara .................. 705/26 |
| 7,107,226 | B1 | * | 9/2006 | Cassidy et al. ................ 705/26 |

(Continued)

FOREIGN PATENT DOCUMENTS

JP  5-20046  1/1993

(Continued)

OTHER PUBLICATIONS

Lesser, Victor et al., "Resource-Bounded Searches in an Information Marketplace," IEEE Internet Computing, Los Alamitos, Mar. 2000, vol. 4, iss. 2, p. 49.*

(Continued)

Primary Examiner—Jeffrey A Smith
Assistant Examiner—Amee A Shah
(74) Attorney, Agent, or Firm—Oblon, Spivak, McClelland, Maier & Neustadt, L.L.P.

(57) ABSTRACT

A component management system includes: a component database for registering component data regarding a plurality of components, which have been admitted to be purchased based on predetermined criteria; an e-mail server for receiving information regarding components from a component provider and for sending the received information to a person in charge of component admission. The component database is updated based on a result of selection performed based on the sent information.

15 Claims, 25 Drawing Sheets

U.S. PATENT DOCUMENTS

| | | |
|---|---|---|
| 2001/0039536 A1 | 11/2001 | Mori et al. |
| 2002/0023060 A1 | 2/2002 | Cooney et al. |
| 2002/0156548 A1 | 10/2002 | Arackaparambil et al. |
| 2003/0014318 A1* | 1/2003 | De La Motte et al. ......... 705/26 |

FOREIGN PATENT DOCUMENTS

| | | |
|---|---|---|
| JP | 6-309390 | 11/1994 |
| JP | 7-105244 | 4/1995 |
| JP | 9-147023 | 6/1997 |
| JP | 9-219790 | 8/1997 |
| JP | 10-149280 | 6/1998 |
| JP | 11-328250 | 11/1999 |
| JP | 2000-57188 | 2/2000 |
| JP | 2000-113051 | 4/2000 |
| JP | 2000-181958 | 6/2000 |
| JP | 2002-99591 | 4/2002 |
| JP | 2003-150607 | 5/2003 |
| JP | 2003-178113 | 6/2003 |
| KR | 2000-0024611 | 5/2000 |
| WO | WO 98/49664 | 11/1998 |

OTHER PUBLICATIONS

Beach et al., An Integrated Manufacturing Data Management System, 1990 IEEE, pp. 306-311.

Furich et al., A Component-Based Application Framework for Manufacturing Execution Systems in C# and .NET.ACM 2000, pp. 169-178.

* cited by examiner

PLANS ON COMPONENT ADMISSION

○ ADMITTED MANUFACTURERS
   ○ CURRENTLY-ADMITTED MANUFACTURERS
      QUARTZ OSCILLATOR    MANUFACTURERS "S" AND "K"
      CERAMIC OSCILLATOR   MANUFACTURER "M"

○ INDEXES FOR DETERMINING WHETHER TO ADMIT MANUFACTURERS
   1. HOLDING HIGH RATE OF SHARE IN MARKET
   2. HAVING BUSINESS WITH US BEFORE
   3. HAVING PRODUCTS CORRESPONDING TO OUR NEEDS

FIG. 3

■RECOMMENDED OSCILLATORS

| ADMITTED MANUFACTURER /SERIES | SPECIFICATION | REFERENCE COST | COST EVALUATION | OSC. STABILITY | AVAILABILITY | TOTAL EVALUATION |
|---|---|---|---|---|---|---|
| MANUFACTURER"A" /B*** | CAPACITY, SMD | ¥13 | ◎ | △ | ○ | ◎ |
| MANUFACTURER"B" /*A** | AT CUT, SMD | ¥50 | ○ | ◎ | ○ | ◎ |
| MANUFACTURER"C" /**U* | AT CUT, INSERTION-TYPE | ¥30 | ◎ | ◎ | ○ | ◎ |
| MANUFACTURER"D" /BBBB | AT CUT, SMD | ¥53 | ◎ | △ | ○ | △ |
| MANUFACTURER"E" /EAEA | AT CUT, SMD | ¥60 | △ | ◎ | ○ | △ |
| MANUFACTURER"F" /ACAC | AT CUT, INSERTION-TYPE | ¥45 | △ | △ | △ | × |

FIG.5

PRODUCT NEWS        *POWER SOURCE IC RC123-A*
    SUMMARY                *XXXX CORPORATION*

"OUR VOLTAGE DETECTORS, Rx5VL SERIES, RUN WITH LOW LEVEL
   CURRENT WITH HIGH ACCURACY AND HAVE BEEN DEVELOPED USING
   CMOS PROCESSING TECHNIQUE. VOLTAGE DETECTORS, Rx5VL,
   INTERNALLY INCLUDES REFERENCE VOLTAGE SOURCE, COMPARATOR,
   RESISTOR FOR VOLTAGE DETECTION, OUTPUT DRIVER, HYSTERESIS
   CIRCUIT, AND OUTPUT DRIVE TRANSISTOR, ETC. ·······

OUTPUT FORMS : Nch OPEN DRAINA & C-MOS
      PACKAGES: THREE
      LOW-CONSUMED CURRENT·················· TYP. 1.0 $\mu$ A(VDD=3.0V)
      WIDE IN VOLTAGE RANGE···········1.5V~10.0V
             ······························

APPLICATION
      RESET OF Nch AND CMOS MICRO-COMPUTER
      BATTERY CHECKER                               DETAIL
      RESET OF LOGIC CIRCUIT
         ················

FIG.6

SEARCH PAGE

SEARCH ITEMS

KEYWORD

⦿ MANUFACTURER

SEARCH

◎ TYPE OF COMPONENT

◎ TREND INFORMATION

FIG.7

EXAMINATION REQUEST

| MANUFACTURER | COMPONENT NAME | MODEL | PRICE |
|---|---|---|---|
| | | | |

- ⦿ DELIVERY BEHAVIOR
- ◎ QUALITY
- ◎ PRICE
- ◎ IMPROVEMENT/CESSATION INFORMATION
- ◎ SUGGESTION ON BETTER COMPONENT

FIG.8

| CLASSI-FICATION | COMPO-NENT ID (COMPANY) | COMPO-NENT ID (PROVIDER) | MANUFAC-TURER | PROVIDER | PRICE | STATUS | SPECIFICATION | ADDRESS OF CATALOGUE | IMPROVEMENT /CESSATION INFORMATION | ADDITIONAL INFORMATION |
|---|---|---|---|---|---|---|---|---|---|---|
| IC | | | | | | | | | | |
| | | | | | | | | | | |
| | | | | | | | | | | |
| CAPACITOR | | | | | | | | | | |
| | | | | | | | | | | |
| | | | | | | | | | | |
| | | | | | | | | | | |

FIG.9

| COMPONENT ID (COMPANY) | COMPONENT ID (PROVIDER) | MANUFAC-TURER | PROVIDER | IMPROVEMENT/ CESSATION INFORMATION | IMPROVEMENT/SUBSTITUTE | URL OF CATALOGUE |
|---|---|---|---|---|---|---|
| | | | | | | |
| | | | | | | |
| | | | | | | |
| | | | | | | |
| | | | | | | |
| | | | | | | |

FIG.10

| DATE | COMPONENT ID (COMPANY) | COMPONENT ID (PROVIDER) | NUMBER OF COMPONENTS | PRICE | PLACE TO DELIVER | DELIVERY DATE | INSPECTOR |
|---|---|---|---|---|---|---|---|
| | | | | | | | |
| | | | | | | | |
| | | | | | | | |
| | | | | | | | |
| | | | | | | | |

FIG.14

| CLASSIFICATION | COMPONENT ID (COMPANY) | COMPONENT ID (PROVIDER) | MANUFACTURER | PROVIDER | PRICE | SPECIFICATION | CATALOGUE INFORMATION | ADDITIONAL INFORMATION |
|---|---|---|---|---|---|---|---|---|
| IC | | | | | | | | |
| CAPACITOR | | | | | | | | |
| | | | | | | | | |

FIG.18B

| COMPONENT ID (COMPANY"CS") | COMPONENT ID (COMPANY"CC") |
|---|---|
| CZ CS20203 | E5352123 |
| CZ CS20209 | E5353567 |
| CZ CS20258 | E5354416 |
| CZ CS23407 | E5355525 |
| ........ | ........ |

FIG.22

| CLASS-IFICATION | COMPONENT ID (COMPANY CC)(PROVIDER) | COMPONENT ID (COMPANY CS) | MANUFAC-TURER | PROVIDER | PRICE | STATUS | SPECIFICATION | CATALOGUE ADDRESS | IMPROVEMENT /CESSATION | ADDITIONAL INFORMATION |
|---|---|---|---|---|---|---|---|---|---|---|
| IC | | | | | | | | | | |
| CAPACITOR | | | | | | | | | | |

FIG.23

COMPONENT MANAGEMENT SYSTEM AND METHOD

CROSS-REFERENCE TO RELATED APPLICATION

This application is a Divisional application of Ser. No. 10/694,022 filed Oct. 28, 2003, now abandoned which was a CON of application Ser. No. 09/909,902 filed Jul. 23, 2001, now abandoned and claims the benefit of priority from the prior Japanese Patent No. 2000-221549, filed on Jul. 21, 2000, the entire contents of which were incorporated by reference in the above-noted parent application Ser. No. 09/909,902.

BACKGROUND OF THE INVENTION

1. Field of the Invention

The present invention relates to a system and method for managing components for use in manufacturing various products.

2. Description of the Related Art

In processes for developing and manufacturing various products (units), many kinds of components are necessary.

Generally, selection and purchasing of components are done under the control of a development section and/or design section in corporations, based on their determination. Various components are selected and ordered by various sections of a single corporation, based on their own determination, under the consideration the quality, function, price, etc. of those components. Information regarding such components are managed individually by each group or section of the corporation.

Conventionally, clear criteria based on which components are selected have not been established. Hence, the components can rarely be selected objectively, and low quality components which are so expensive for the quality might have been purchased. Further, in many cases, many kinds of components which kind of which is very few in number are ordered, resulting in high cost for ordering and purchasing those components.

The quality and price of components change from time to time. The information regarding the components are separately managed by the sections of the corporation. Hence, updating of such information may repeatedly be done, and such updated information may be leaked. In such structure, the management of the component information can not efficiently be performed. Thus, some components which have been considered as those not to be purchased any more may be selected and purchased by someone in the corporation.

SUMMARY OF THE INVENTION

The present invention has been made in consideration of the above. It is accordingly an object of the present invention to provide a system for collectively managing information regarding components and for selecting high quality components with ease.

Another object thereof is to provide a system which enables to lower the cost of ordering and purchasing components.

In order to accomplish the above object, according to the first aspect of the present invention, there is provided a component management system comprising:

a component database which registers component data regarding a plurality of components which have been examined based on a predetermined criterion and including their examination results;

a receiver which receives information regarding the plurality of components;

a component-data updating section which updates the component data registered in the component database, in accordance with predetermined examination based on the information received by the receiver; and a selector which selects an arbitrary component from the plurality of components registered in the component database.

According to this structure, component data representing admitted components are registered in the component database. Of the registered components, some components can be selected, thereby a designer of a company can select high quality components with ease. The component data is updated based on information sent from the component provider. Thus, in the case where the components are improved or the manufacture of the components are ceased, some components can preferably be selected in accordance with the information regarding the improvement or cessation, without concerning the individual component.

The component data may include data representing whether each of the plurality of components is a component admitted to be purchased based on the examination results; and the selector may select an arbitrary component from the plurality of components to be purchased, based on the component data.

The component data may include data representing whether each of the plurality of components is a component admitted to be purchased based on the examination results, and the system may further comprise a selector for warning that a component which is not admitted to be purchased is selected by the selector, based on the component data.

The component data may include a recommendation to use a component based on the examination results.

The component data includes a rating of a component determined by examination.

The component may be examined based on the component data received by the receiver; and the component data updating section may include registration means which registers, in the component database, the component data regarding the plurality of components, which has been examined, and means which adjusts a rating of each of the plurality of components in accordance with re-examination results based on the information received by the receiver.

The component management system may further comprise means which provides a predetermined criterion based on which each of the plurality of components is examined. In this case, the component database registers the component data regarding at least one component which satisfies the predetermined criterion.

The component management system may further comprises means which provides a criterion based on which each of the plurality of components is examined. The component data may include data representing whether each of the plurality of components satisfies the criterion.

The component management system may further comprises: input means which inputs information for specifying a component; and retriever for retrieving information representing a component which satisfies the input information from, the component database.

The component management system may comprise a catalogue database which stores an electronic catalogue specifically reporting information representing the plurality of components stored in the component database. In this case, the component data registered in the component database is linked to information representing the electronic catalogue, so that the electronic catalogue can be accessed through the component data.

The component management system may further comprise: an index-information storage which stores index information which can be an index for selecting a component; and means which reads and provides, in response to a request, index information corresponding to the request from the index-information storage.

The component management system further comprises an improvement/cessation database which stores improvement/cessation information representing if any of the plurality of components represented by the information obtained by the retriever is improved, to be improved or not to be manufactured any more. In this case, the component-data updating section updates the component data registered in the component database, based on the improvement/cessation information registered in the improvement/cessation database.

The receiver may be prepared commonly for a predetermined range of organizations.

The component management system may further comprises means which requests for examination of a component.

The component management system may further comprising a selector which selects a component for use in manufacturing a product, of the plurality of components registered in the component database.

The component management system may further comprise: an application terminal which applies for purchasing a component registered in the component database; and a purchase terminal which executes a process for purchasing the component in response to the applying for purchasing the component.

The component management system may further comprise: a second database which stores a part of or entire copy of the information stored in the component database; and means which updates the second database in accordance with a predetermined examination criterion.

In order to accomplish the above object, according to the second aspect of the present invention, there is provided a component management method comprising:

settling an admission criterion for admitting a component;

examining a component based on the admission criterion, and registering the component admitted by the examining in a component database;

receiving information regarding a plurality of components;

updating the component data registered in the component database, in accordance with an examination based on the received information; and selecting an arbitrary component from the plurality of components registered in the component database based on the component data.

In order to accomplish the above object, according to the third aspect of the present invention, there is provided a component management method comprising the steps of:

settling an admission criterion for admitting a component;

examining a component based on the admission criterion, and registering the component admitted by the examining in a component database;

receiving improvement/cessation information about a component through a network;

updating the component database based on the received improvement/cessation information, thereby updating contents of the component database based on the improvement/cessation information; and selecting a component which is to practically be used, from a plurality of components registered in the component database.

The method may further comprising the steps of:

determining whether a component, included in the improvement/cessation information after being updated, can be a component to be purchased;

registering, in a case where it is determined that the component can be purchased, component information representing the determined component in the component database; and lowering, in a case where it is determined that the component can not be purchased, a rating of the component which has been determined as a component not to be purchased.

The method may further comprise the steps of:

preparing electronic information which can serve as an index for selecting a component; and showing the electronic information, in response to a request for the information.

The method may further comprise the steps of:

receiving the improvement/cessation information about components, and storing the received information in an improvement/cessation database; and updating component information stored in the component database, based on the improvement/cessation information registered in the improvement/cessation database.

BRIEF DESCRIPTION OF THE DRAWINGS

These objects and other objects and advantages of the present invention will become more apparent upon reading of the following detailed description and the accompanying drawings in which:

FIG. 3 is a diagram showing an example of a Web page showing some criteria for use in determining whether to admit components;

FIG. 5 is a diagram illustrating an example of a Web page showing recommendation information for selecting components;

FIG. 6 is a diagram illustrating an electronic catalogue (a Web page) reporting various components;

FIG. 7 is a diagram illustrating a search page (a Web page) for searching for information regarding components;

FIG. 8 is a diagram illustrating an examination request page (a Web page) for requesting examination of components;

FIG. 9 is a diagram showing an example of a table of a component database;

FIG. 10 is a diagram showing an example of a table of an improvement/cessation database;

FIG. 14 is a diagram exemplifying a table of an ordering database;

FIG. 18B is a diagram specifically showing the component list of FIG. 18A;

FIG. 22 is a diagram showing an ID conversion table showing component ID numbers employed both in companies CS and CC;

FIG. 23 is a diagram showing an evaluation information file storing component information in association with each component number and evaluation information.

DETAILED DESCRIPTION OF THE PREFERRED EMBODIMENTS

A component management system according to preferred embodiments of the present invention will now be explained.

First Embodiment

A component management system according to the first embodiment is installed in a corporation, company, organization, etc. (hereinafter, referred to as a company), and manages ordering of those components (parts) which are used in the company.

Figure 1:
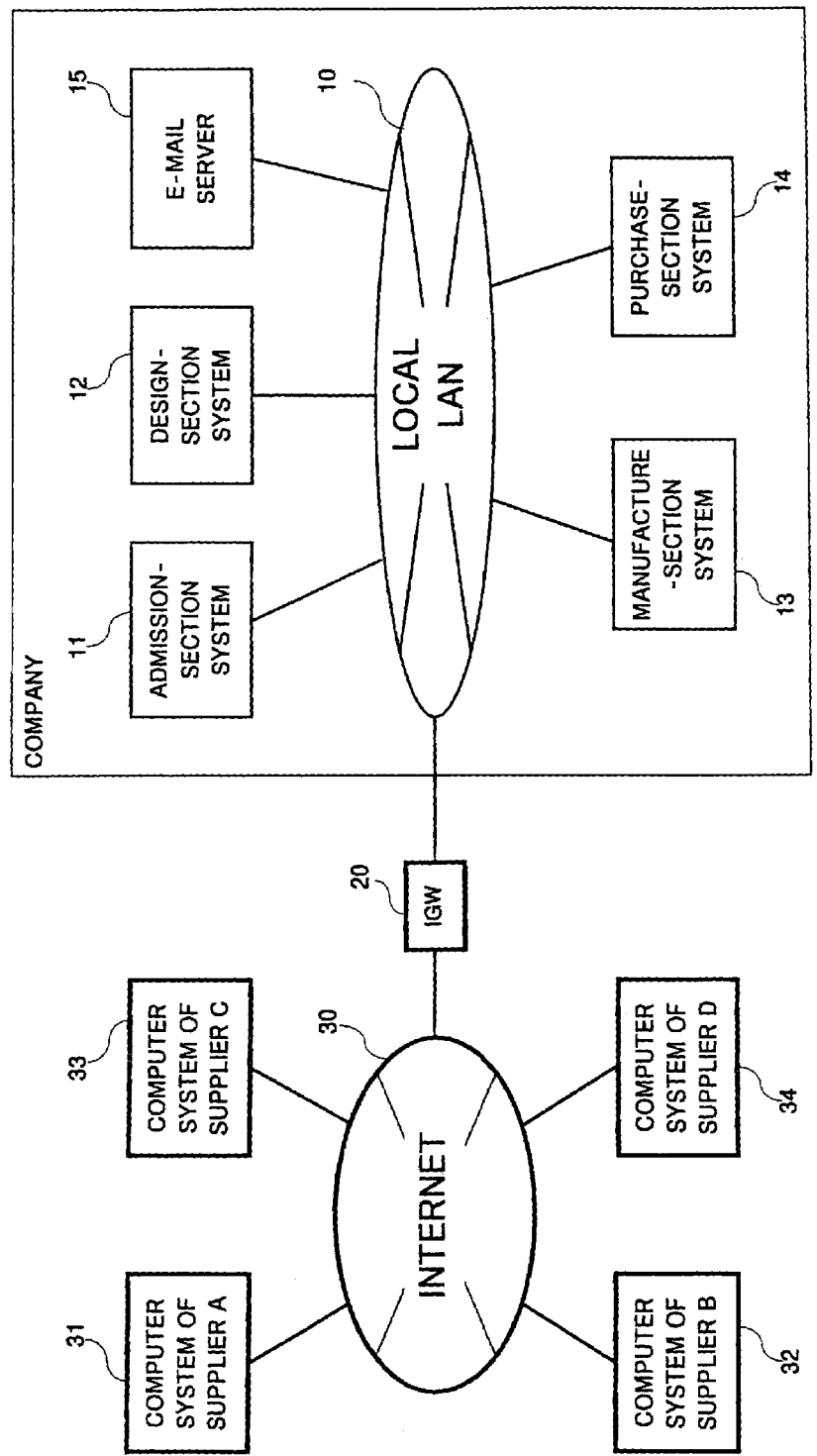
FIG. 1 is a diagram showing the structure of a component management system according to the first embodiment of the present invention.

As shown in FIG. 1, the component management system includes an admission section system 11, a design-section system 12, a manufacture-section system 13, a purchase-section system 14, and an e-mail server 15, which are all connected with each other through a local (company) LAN (Local Area Network) 10. This system is connected to the Internet 30 through an Internet Gateway (IGW) 20 and the Internet 30 is in turn connected to supplier computer systems 31, 32, 33, and 34 of exemplary suppliers A-D.

Figure 2:
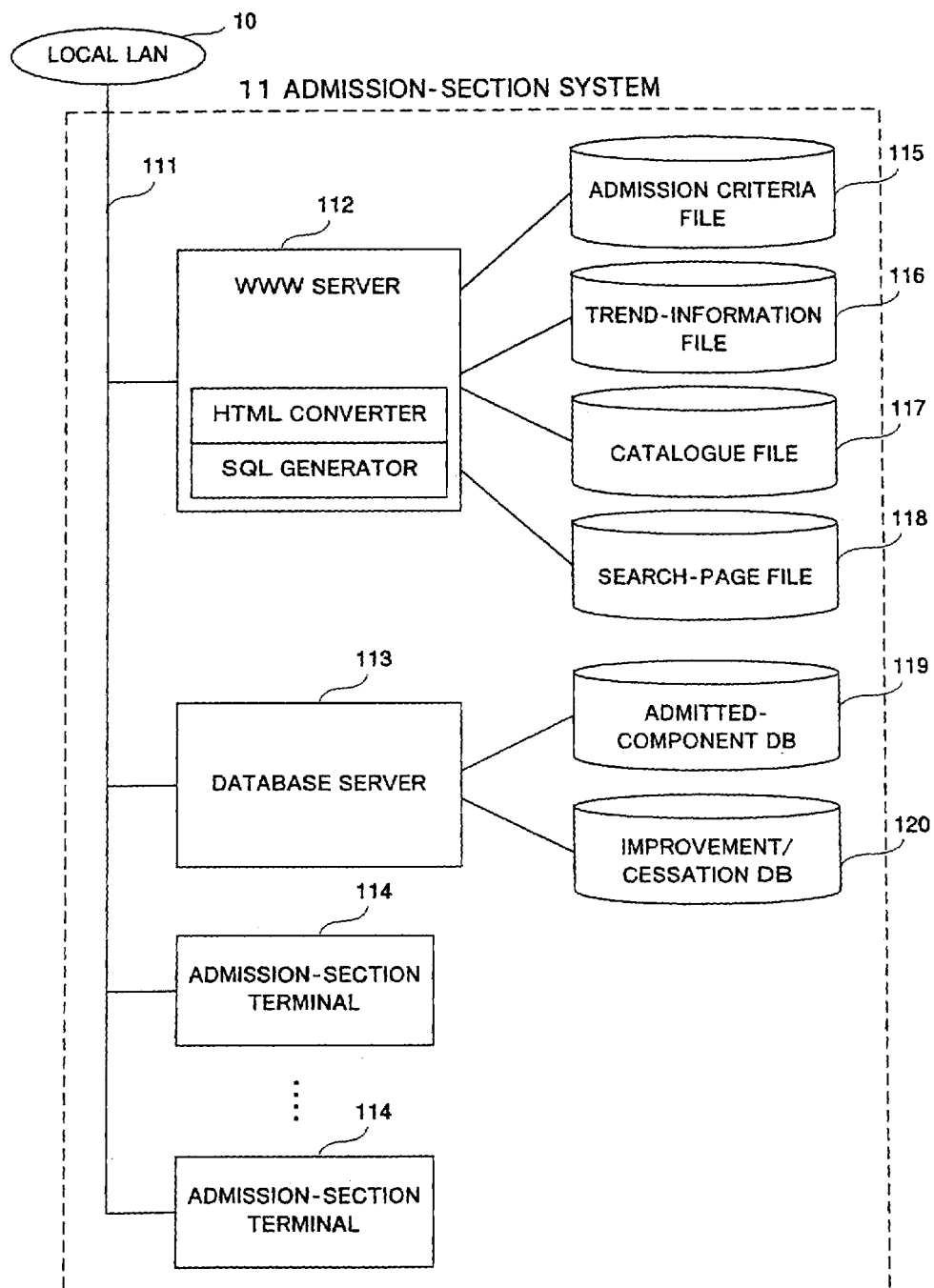
FIG. 2 is a diagram showing an example of the structure of an admission section system included in the component management system.

The admission section system (examining section system) 11 includes, as illustrated in FIG. 2, a WWW server 112, a database server 113, and a group of admission section terminals 114, which are connected with one another on an internal LAN 111.

The WWW server 112 includes an admission (examining) criteria file 115, a trend information file 116, a catalogue file 117, and a search-page file 118. The WWW server 112 provides a corresponding terminal having a WWW browser with a document (a Web page) written in Hypertext Markup Language (HTML), through a network (LAN 10, Internet 30, etc).

The admission (examination) criteria file 115 stores a Web page for showing the criteria for admitting (selecting) those necessary components which are used in this company, like that shown in FIG. 3.

Figure 4:
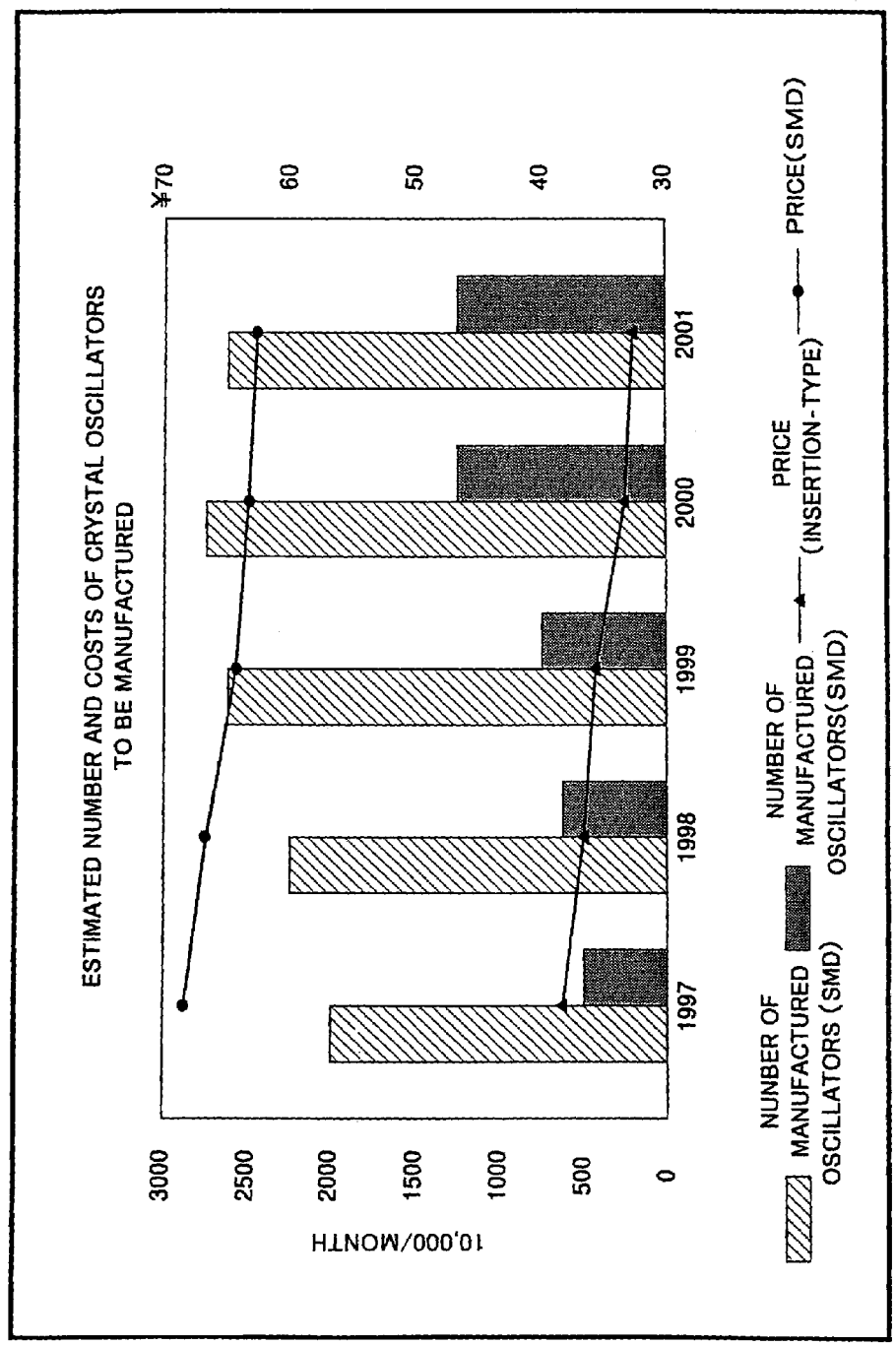
FIG. 4 is a diagram showing an example of a Web page showing index information for selecting components.

The trend information file 116 stores a set of Web pages showing indexes for selecting components and made based on the trend in technology, the trend in market, the vision in the "supply and demand" of a product (e.g. an oscillator in this embodiment), the estimated fluctuation in price, etc., as shown in FIG. 4. The trend information file 116 stores also a set of Web pages showing recommendation information regarding some components recommended by the admission section of the company, together with the fluctuation in price, etc., as that shown in FIG. 5.

The catalogue file 117 stores an electronic catalogue (Web pages showing catalogue information) reporting various components (parts), as illustrated in FIG. 6.

The search-page file 118 stores, for example, a search (retrieve) page (a Web page for searching) for searching for information regarding components, as illustrated in FIG. 7, or an examination request page (a determination request Web page) for requesting for examining a particular component, as illustrated in FIG. 8. Note that the information to be searched includes information representing a corresponding component manufacture, information representing a kind of a corresponding component, and trend information of the corresponding component. Note also that the examination of the particular component is done, based on its delivery behavior, quality, cost, and improvement/cessation information. In the case where there is a new component better than an already-admitted component, the new component can be suggested.

The WWW server 112 includes, with relevance to a search function, an SQL generator and an HTML converter. The SQL generator produces SQL statements for querying, updating, and managing relational databases, based on a keyword (or a set of keywords) or logical expression for retrieval which is input in the search page. The HTML converter converts the data retrieved from databases into a Web page in the form of HTML.

The database server 113 includes an admitted component database 119 and an improvement/cessation database 120. In response to an externally-transmitted SQL statement, the database server 113 searches the above databases 119 and 129 for information stored therein, and provides the searched information. The database server 113 also updates the information stored in the databases, based on external information.

The admitted-component DB 119 registers information regarding components which are to be used in the company and admitted by the admission section. As shown in FIG. 9, the admitted-component DB 119 stores information which is classified into data items of, "Component ID (company)" which is employed in the company, "Component ID (provider, supplier)" which is used by the component provider or supplier, "Manufacturer", "Price", "Admission Information (including recommended component, allowable component, etc.)", "Status (status information)", "Specification ", "Catalogue Address" of a catalogue reporting a corresponding component and included in the catalogue file 114, "URL Address of Relevant Information" which can be linked to the corresponding Web page, "Address of Corresponding Data" which may be included in the improvement/cessation database if there is any, and "Additional Information", according to component.

The improvement/cessation DB 120 is to temporarily store improvement/cessation information, which is sent from the component provider (manufacturers, firms, etc.) and represent if a corresponding component is improved or will not be manufactured any more, related to components and provided in the form of an e-mail. As shown in FIG. 10, the improvement/cessation DB 120 stores information which is classified into data items of "Component ID (company)" employed in the company, "Component ID (provider)" employed in the component provider, "Manufacturer", "Improvement/Cessation", "Improvement/Substitute", "Address of Corresponding Data" which may be included in the admitted component database 119, and "URL (Address) of Catalogue Information on Internet 30".

The group of admission section terminals 114 refer to and update information which are stored in the admission criteria file 115, trend information file 116, catalogue file 117, search-page file 118, admitted component database 119, and improvement/cessation database 120.

Figure 11:
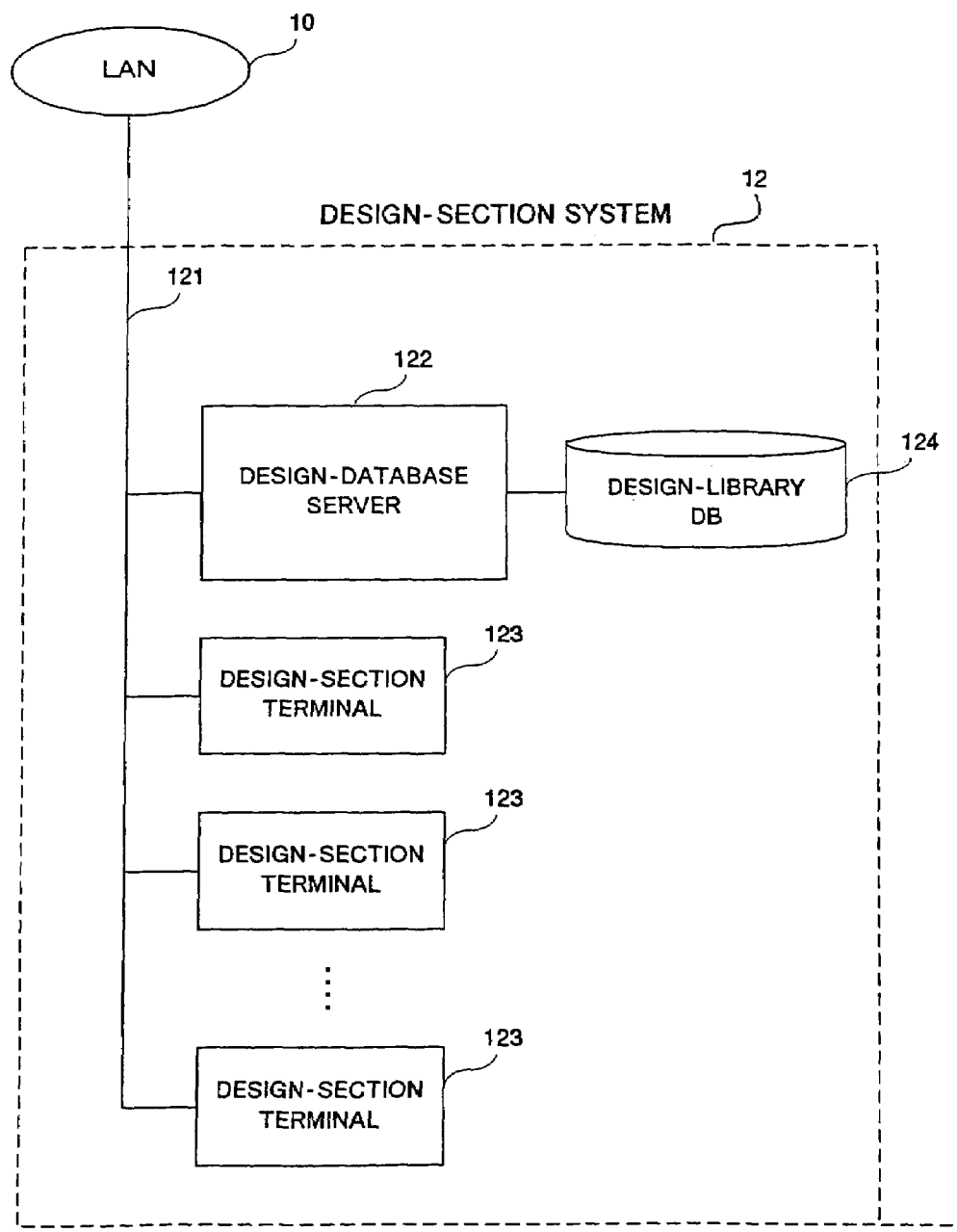
FIG. 11 is a diagram exemplifying the structure of a design-section system.

The design-section system 12 shown in FIG. 11 includes a design-database server 122 and a plurality of terminals 123 for designing which are connected with one another on an internal LAN 121.

The design-database server 122 includes a design-library database 124 including libraries for designing.

Each of the terminals 123 includes a CAD system, and is for use in designing engineering, architectural, and scientific models, using a library stored in the design-library database 124 through the design-database server 122.

A browser program and a mailer program are installed in each of the terminals 123, so that each of the terminals 123 can access the WEB server 112 and the DB server 113 through the local LAN 10.

Figure 12:
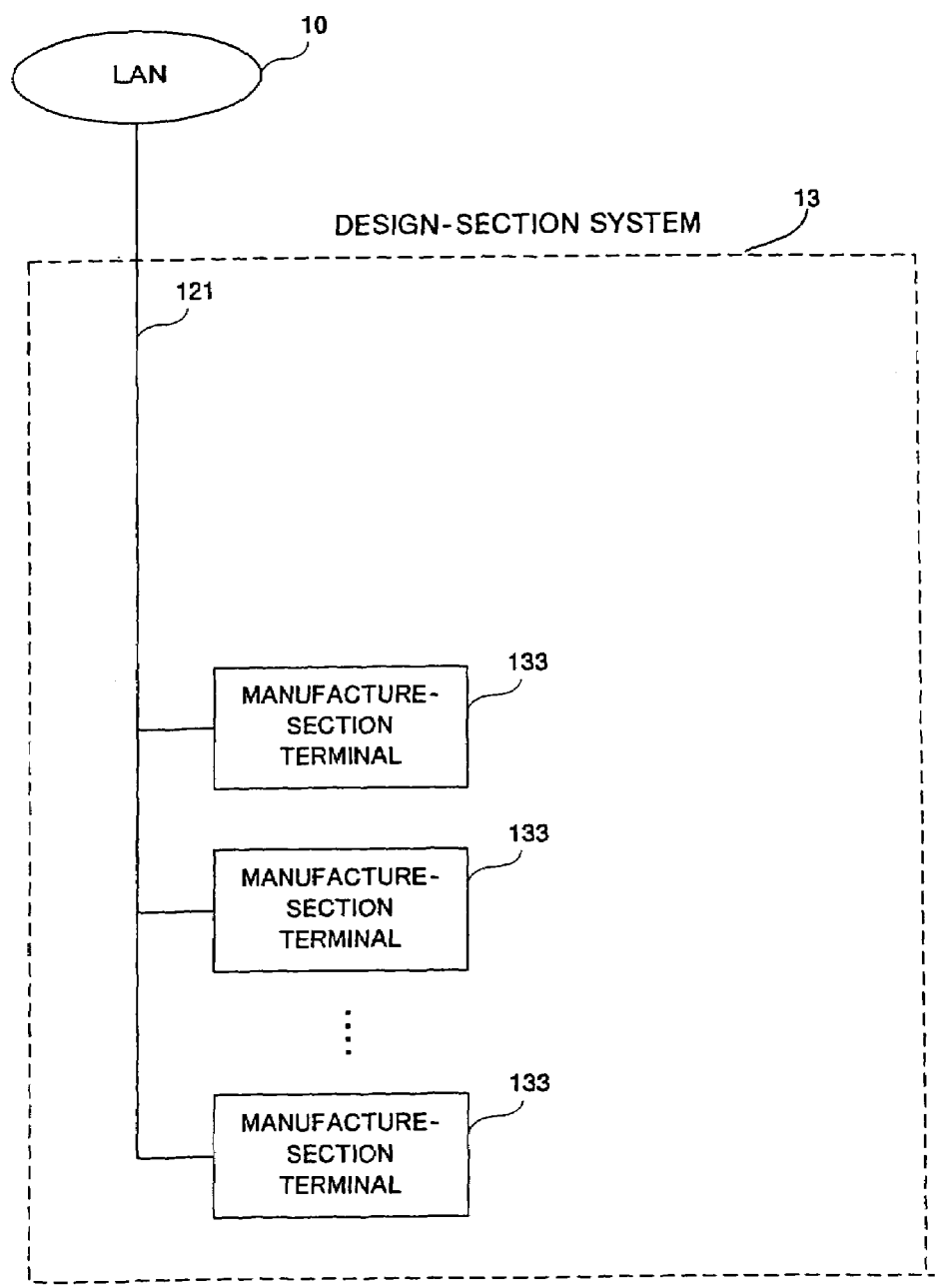
FIG. 12 is a diagram exemplifying the structure of a manufacture-section system.

The manufacture-section system 13, as shown in FIG. 12, includes a plurality of manufacture-control terminals 133 which are connected with each other through the internal LAN 131. Each of the plurality of manufacture-control terminals 133 is used by a person in charge in the manufacture section for controlling manufacture processes, ordering components, and checking the stock. Note that the manufacture-section system 13 is prepared, for example, in each factory of the company.

Figure 13:
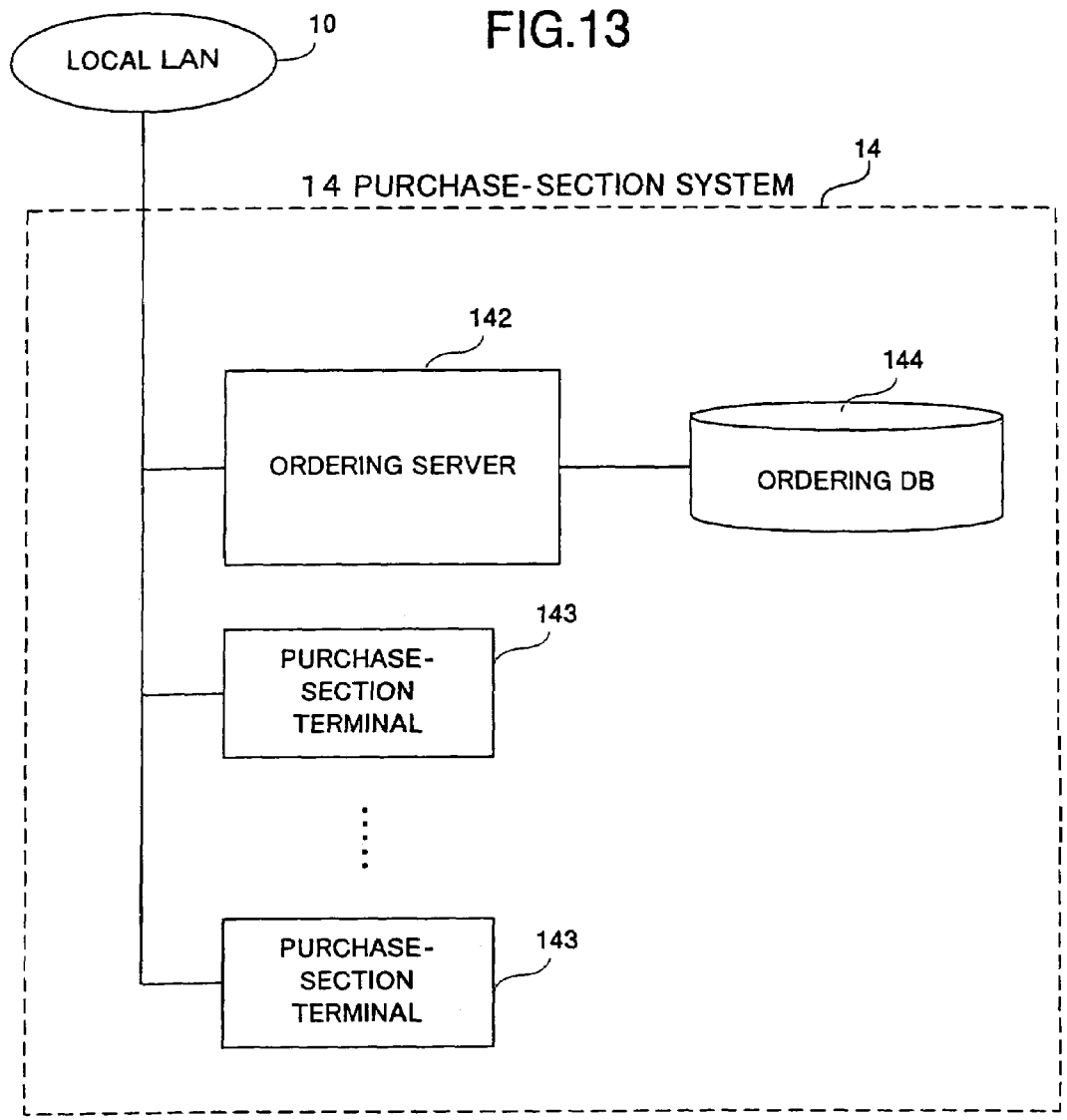
FIG. 13 is a diagram exemplifying the structure of a purchase-section system included in the management component system of FIG. 1.

The purchase-section system 14 serves as a purchase section for purchasing things sold outside of the company. The purchase-section system 14 includes, as shown in FIG. 13, an ordering server 142 and a plurality of purchase-section terminals 143 which are connected with one another through an internal LAN 141.

The ordering server 142 includes an ordering database 144 which stores ordering information. As illustrated in FIG. 14, this ordering DB 144 stores information regarding components ordered by the company, and includes data items of "Order Date", "Component ID (company)" employed in this company, "Component ID (provider)" employed in the component provider, "Number of Ordered Components", "Price", "Place to Deliver", "Delivery Date", and "Inspector Name".

The purchase-section terminals 143 has a function for updating the ordering B144 and a function for sending e-mails for ordering components to component provider.

The e-mail server 15 shown in FIG. 1 controls transmission of emails to be transmitted between persons in charge in each section of the company and any other persons inside or outside of the company.

The local LAN 10 is connected to the Internet 30 through the Internet gateway 20. Connected onto the Internet 30 are computer systems 31 to 34 of manufacturers which manufacture and provide components to the company.

Figure 15:
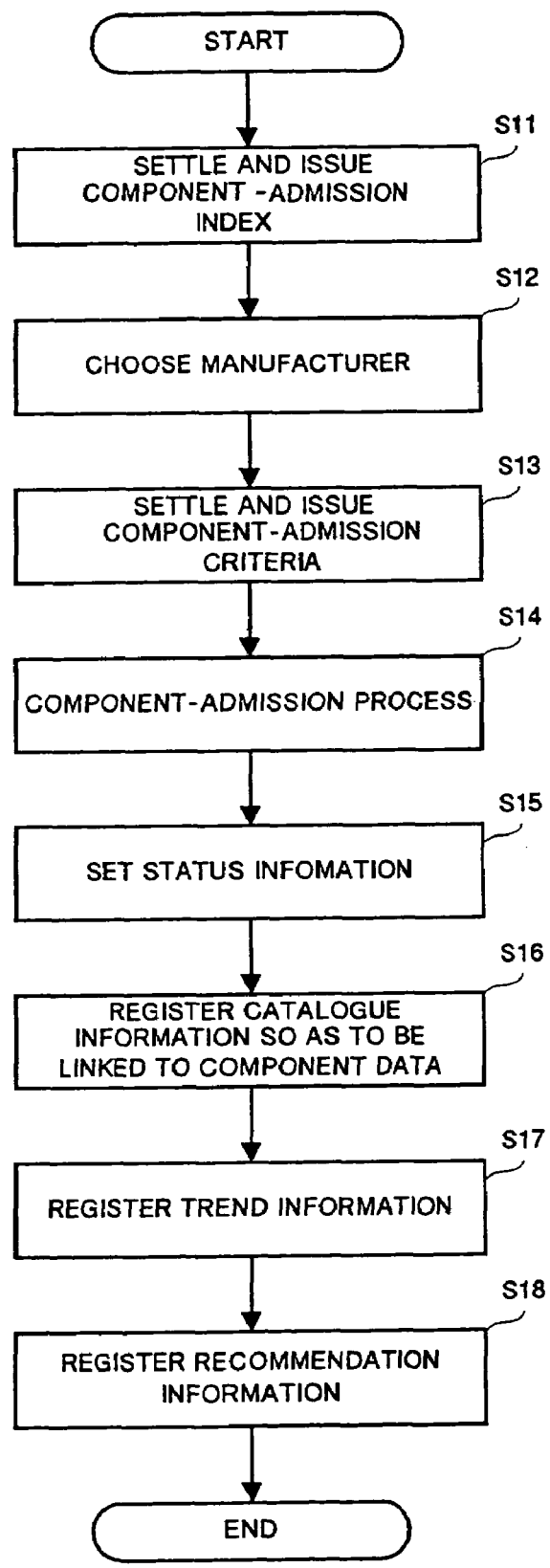
FIG. 15 is a flowchart for explaining a process for managing/controlling components.

Explanations will now be made to an process, for managing/controlling components with the utilization of the component management system having the above-described structure, with reference to a flowchart of FIG. 15. The admission section admits (selects) those components allowable to be used in the company. That is, the admission section performs a process for admitting some components, in accordance with some pre-set criteria, which had conventionally been selected freely by each of the design section or manufacture section according to their own determination and needs.

Specifically, the admission section settles admission criteria (criteria for admitting components allowable to be used in the company), and clarifies the settled criteria (index information) (Step S11).

The admission section choose a few manufacturers based on the cooperativeness of manufacturers toward the company, quality and price of components to be provided therefrom, delivery timing of ordered components, and the like (Step S12).

The admission section settles admission criteria for admitting components, based on the specification, quality, stability in delivery behavior, price, simplicity of disposal or recycle process, etc. (Step S13) Otherwise, the admission section examines component specification given from the manufacturers and request information from the design section and/or manufacture section, in association with the quality and delivery timing of ordered components, and sets the admission criteria (Step S13).

Once the admission criteria are completed, the admission section creates the admission criteria in the form of an HTML document, and registers this HTML document in the admission criteria file 115, as exemplarily shown in FIG. 3.

The admission section admits (selects) those components which satisfy the completed admission criteria, affixes predetermined numbers to the admitted components which are commonly acknowledged inside the company, and registers the admitted components with the numbers affixed thereto, in the admitted-component DB 119 (FIG. 9) (Step S14).

At this time, if a plurality of components have similar specifications to each other so as to satisfy the admission criteria, the admission section chooses two to four components from the plurality of components.

The admission section sets admission (status) information for the admitted component(s) (Step S15).

This admission (status) information includes information representing whether each admitted component can be employed or whether each admitted component can be employed on some conditions. The admission information can, therefore, be used when selecting desired component(s) from the plurality of registered components.

The status information includes the status of the components: such as "Recommended" representing that a corresponding component is positively recommended; "Admitted" representing that the component is simply admitted to be employed; "Under Examination" representing that the component is now under examination; "Non-Recommended" representing that the component is recommended to be employed; "Conditioned" representing that the component may be employed under such a condition that the component may not easily be acquired; "Prohibited" representing that the component can not be employed; "Ceased" representing that the component will no longer be manufactured; and "Rejected" representing that the component is rejected to be registered in the admitted component database.

To safely prepare for any trouble which may occur in any one of component manufacturers or providers, the admission section admits components provided from a plurality of manufacturers or providers.

The admission section registers catalogue information (electronic catalogue) showing the admitted components, in the catalogue file 117, and sets information of the admitted components to be linked to the information stored in the admitted-component DB 119 (Step S16).

The admission section researches into the trend in technology, the trend in quality, and the estimated fluctuation in price in several year span, according to the field of components. Then, the admission section creates information like that shown in FIG. 4 in the HTML form, based on results of the research, and registers the created information in the trend-information file 116, so that the registered information can be viewed (Step S17).

The admission section creates recommendation information regarding those components admitted by the admission section, as shown in FIG. 5. The admission section forms the created recommendation information in the HTML form, and registers the recommendation information in the trend information file 116, so that the registered information can be viewed by members of the company (Step S18).

According to the above processes, the plurality of components are examined by the admission section, and the information representing the examination can be viewed by the employees of the company.

Figure 16:
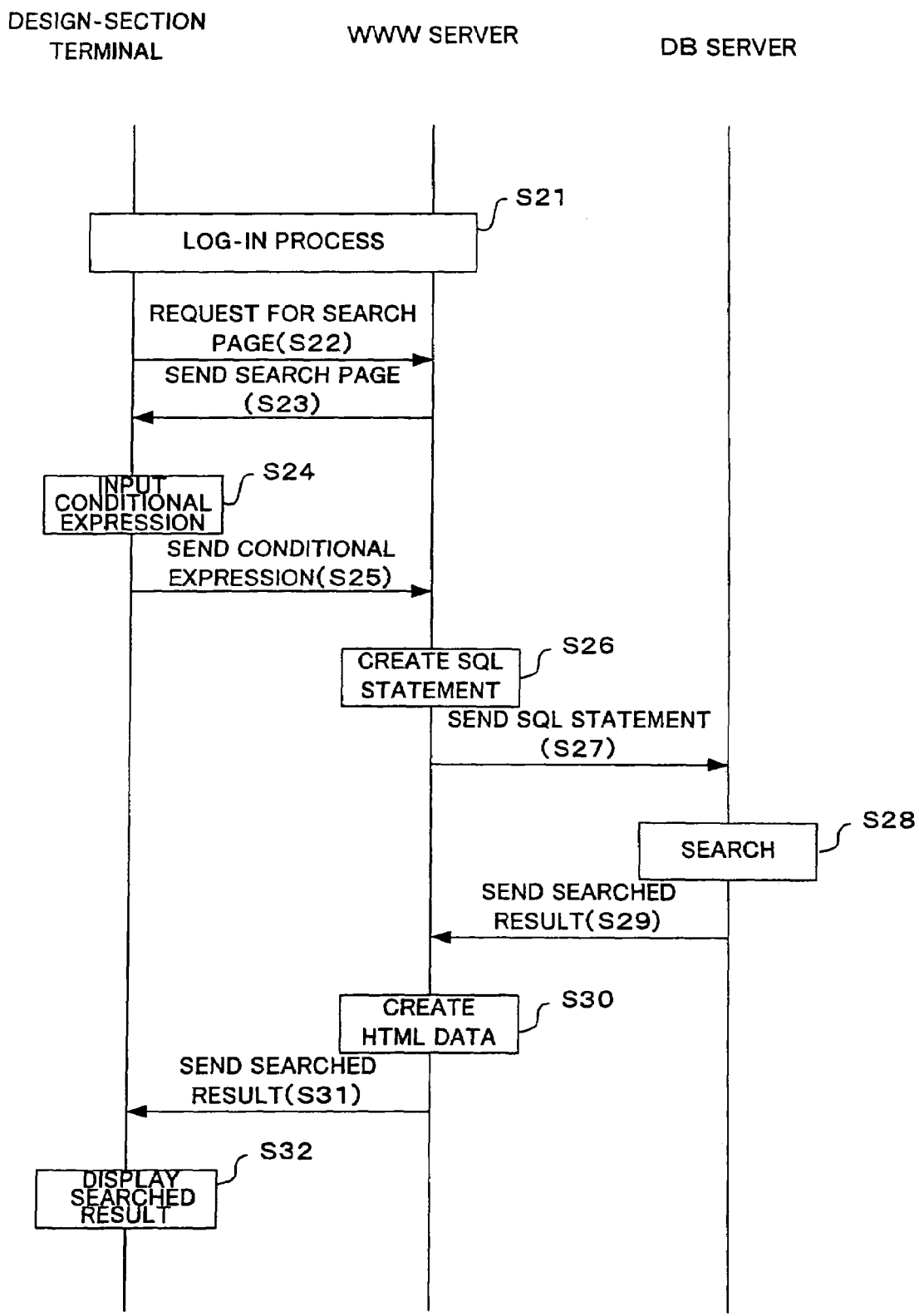
FIG. 16 is a flowchart for-explaining a process for selecting a component(s)

The designer in the design section designs some models using the library, etc. which is registered in the design-library database 124, with the utilization of his/her own terminal 123 for designing. In the process of designing, the terminal 123 refers to the admitted-component DB 119, and chooses one or more components having desired characteristics from a plurality of admitted components. Explanations will now be made to a process for selecting the component(s) with reference to a flowchart of FIG. 16.

In the case where to select a desired component, the designer in the design section accesses the WWW server 112 using the terminal 123. A predetermined log-in process is carried out between the design-section terminal 123 and the WWW server 112 (Step S21). If log-in is established, the designer displays an search page, shown in FIG. 7, stored in the search-page file 118 (Steps S22 and S23). Subsequently, the designer inputs a predetermined keyword, a conditional expression, for inputting an instruction for searching some kind of component and an instruction for searching some component, in accordance with the format of the search page (Step S24). In response to the input instruction, the terminal 123 sends the conditional expression necessary for the searching to the WWW server 112 (Step S25). The SQL generator of the WWW server 112 forms SQL statements for finding a desired component based on the input keyword and conditional expression, from the admitted-component DB 119 (Step S26), and sends the formed SQL statements to the database server 113 through the internal LAN 111 (Step S27).

The database server 113 searches the admitted-component DB 119 for desired information, based on the received SQL statements (Step S28), and sends the searched information to the WWW server 112 (Step S29).

In the WWW server 112, the HTML converter converts the sent information into text data in the HTML format (Step S30), and sends the converted HTML data to the terminal 123 (Step S31). The terminal 123 displays the received HTML data on the WWW browser (Step S32). Having performed the above, the designer can extract the component(s) having the desired specification, from the plurality of components which have in advance been admitted based on the admission criteria by the admission section.

In the case where to select a component, the designer can refer to the trend information stored in the trend-information file 116.

Figure 17:
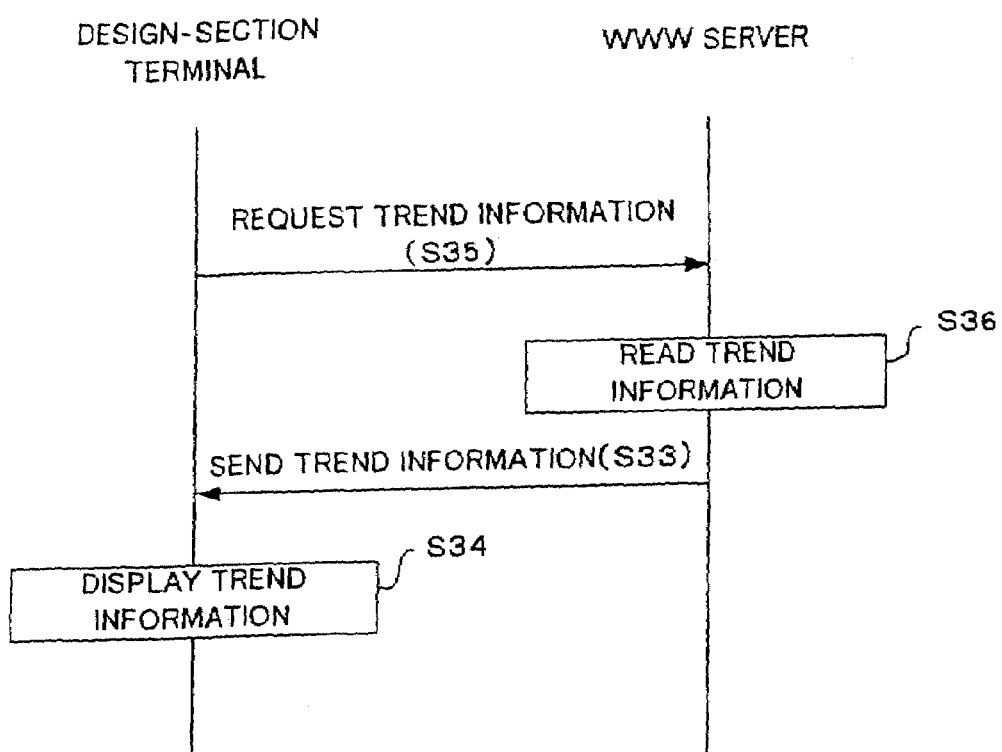
FIG. 17 is a flow-diagram for explaining a process for requesting trend information.

In this case, the designer accesses the WWW server 112 from the terminal 123 (e.g. a CAD system), and requests for the trend information, as shown in FIG. 17 (Step S35). In response to this request, the WWW server 112 reads out corresponding trend information from the trend-information file 116 (Step S36), and sends the read information to the design-section terminal 123 (Step S33). The design-section terminal 123 displays the received trend information (Step S34). The designer can refer to the future trend in the technology of a component and analysis of the trend in the market of the component, based on the displayed trend information. By referring to the analysis of the trend of the component in the market, it is possible to select a component under the consideration of the future trend of the component. Further, by referring to the recommendation information set by the admission section, it is possible to focus on some components to a certain extent, of the plurality of admitted components.

The designer of the design section may refer to the information registered in the admitted-component DB 119, so as to use the referred information for designing.

For example, in the case where the designer is to create a list of components on a design drawing, specification information specifically representing components may automatically be created using the contents of the DB 119.

Figure 18A:
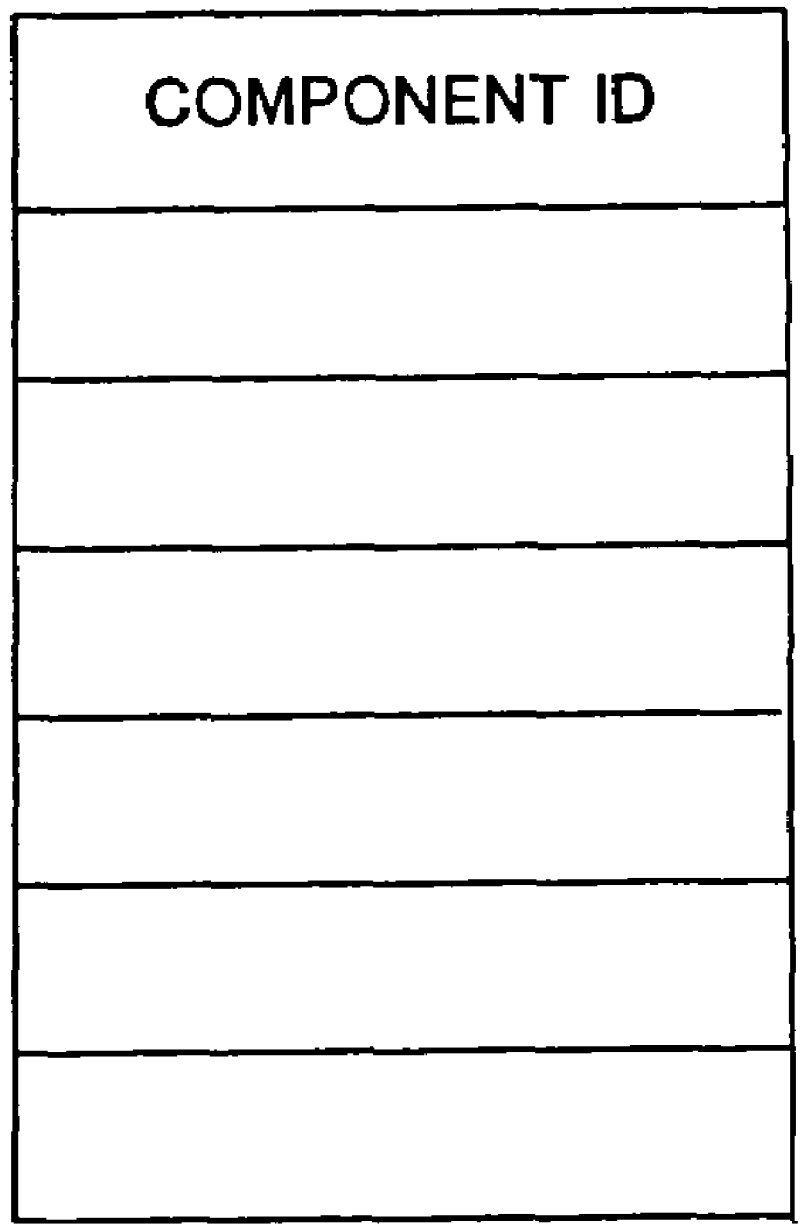
FIG. 18A is a diagram briefly showing a component list.
Figure 19:
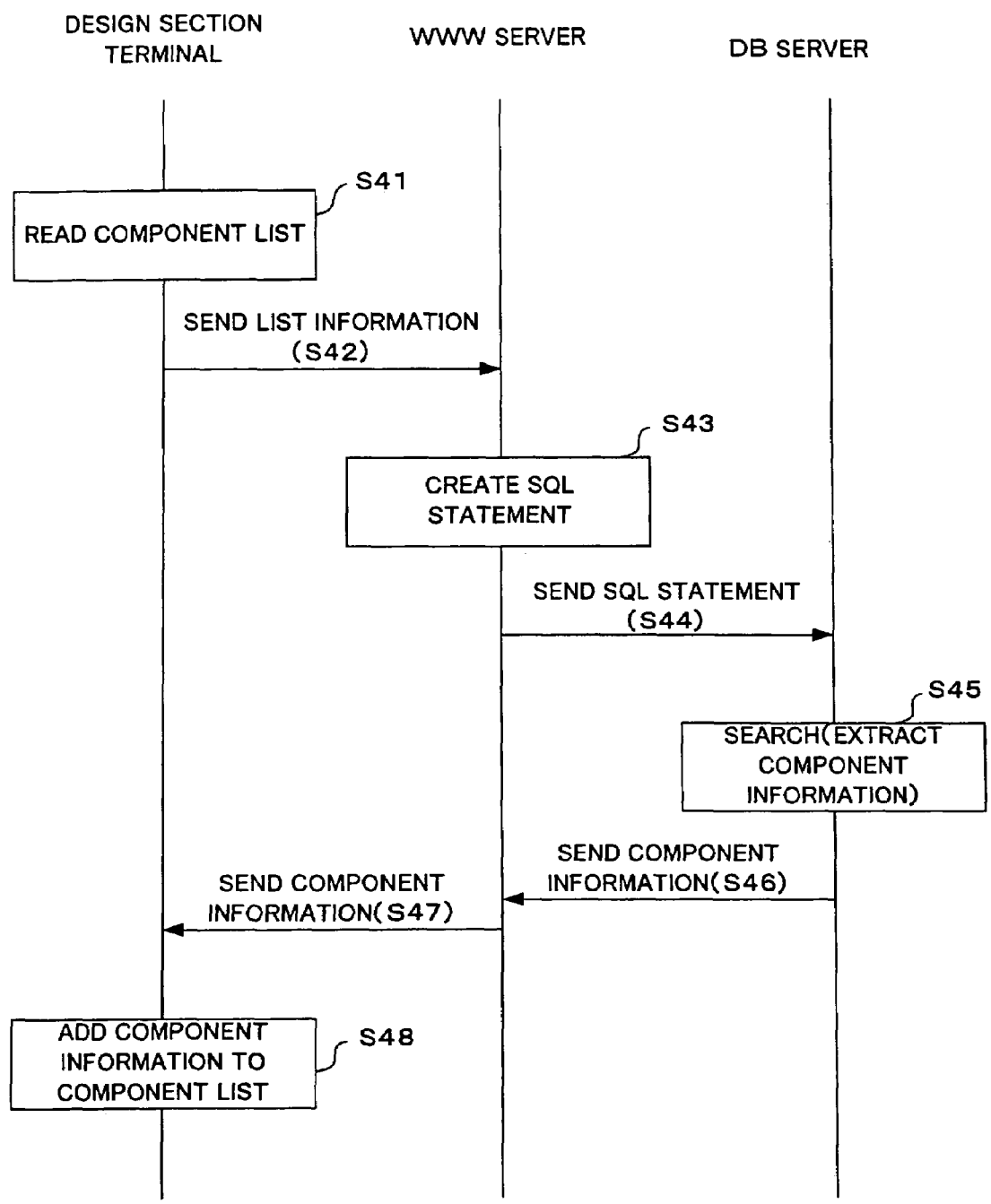
FIG. 19 is a flow-diagram for explaining a process for retrieving component information from a component list.

At this time, the designer registers only components IDs in the list, as shown in FIG. 18A. At the end of the designing, the designer inputs an instruction for creating the list of the components to be used.

In response to this instruction, the design-section terminal 123, reads out the list of the components from the design drawing (Step S41), and informs the WWW server 112 about the listed components (Step S42). The WWW server 112 generates an SQL statement for obtaining information regarding the informed components (Step S43), and sends the generated SQL to the DB server 119 (Step S44). The DB server 113 searches the admitted-component DB 119 and improvement/cessation DB 120 for searched information in accordance with the generated SQL statement, so as to obtain the information regarding the components (Step S45). If there is components which is not admitted to be used or purchased in the list, the DB server 119 adds warning information to the searched information. The DB server 113 sends the obtained information to the WWW server 112 (Step S46), and the WWW server 112 sends this information to the design-section terminal 123 (Step S47). The design-section terminal 123 stores the received component information on a recording medium, in association with the components included in the component list (Step S48).

As a result of this, the rough component list shown in FIG. 18A can automatically be formed into a specific component list specifically including information regarding the components included in the list, as shown in FIG. 18B. Further, even if the designer selects components which is not admitted to use, he or she can fine it with the warning information.

If the terminal 123 specifies (by, for example, clicking on) a name of a component stored in the admitted-component DB 119, it may automatically acquire its corresponding component ID and additional information of the component, and may put the acquired information on the design drawing.

When the design section intends to order components for use in the designing or experiment, it sends an e-mail in a predetermined format to a predetermined address of the purchase section. This e-mail contains the following data items of: (1) section code/section name; (2) name of sender/ID code; (3) component ID employed in the company; (4) number of ordered components; (5) delivery date; (6) place to deliver, (7) reason(s) to purchase; and (8) sanctioner.

The procedures of dealing with this e-mail will be explained in the description of the purchase section.

The manufacture section manufactures products to be sold, while managing the stock with using its terminals. When to order components employed for manufacturing the products, the manufacture section orders the components generally based on the design specs. When to select components, the manufacture section refers to the admitted-component DB 119 or trend information file 116, and selects any components with the desired specifications from a plurality of admitted components, likewise the case of the design section. It is prohibited to use or select any of those components which have not been admitted to be employed.

When the manufacture section requests for purchasing predetermined components, it sends an e-mail of a predetermined format to a predetermined address of the purchase section. The format of this e-mail is the same as that of the e-mail sent from the design section to request for purchasing components. The e-mail contains the following data items of: 1. section code/section name; 2. name of sender/ID code; 3. component ID employed in the company; 4. number of ordered components; 5. delivery date; 6. place to deliver, 7. reason(s) to purchase; and 8. sanctioner.

The ordering server 142 of the purchase-section system 14 periodically accesses the e-mail server 15, and reads out e-mails, which are addressed to the predetermined e-mail address for applying for purchasing components, from an e-mail box of the e-mail server 15.

A purchaser of the purchase section authenticates whether the contents (application for purchasing components) of the e-mail read by the ordering server 142 are appropriate information, or not. In this case, the purchaser may ask the applicant or sanctioner so as to make sure that the contents of the read e-mail are adequate information, if necessary.

In the case where it is determined that the contents of the read e-mail are appropriate information, the purchaser prepares an order sheet for ordering components, and sends the order sheet, in the form of an e-mail, to an e-mail address of the component provider. Thus prepared order sheet includes the following data items of: 1. addressee (component provider name, name of person in charge); 2. order number; 3. ordering company name; 4. section name; 5. purchaser name; 6. component number used in component provider, 7. component number employed in the company; 8. number of ordered components; 9. delivery date; and 10. place to deliver.

The purchaser registers contents of this ordering sheet in the ordering DB 144.

Upon reception of the e-mail sent from the purchase section of the company, the component provider sends a confirmation e-mail to the purchase section and prepares to deliver the ordered components. Upon reception of the confirmation e-mail, the purchaser of the purchase section sets a flag representing that the confirmation e-mail has been received, in a corresponding column of the ordering DB 144.

Once the ordered components are delivered to a specified place, the inspector inspects the delivered components, and sends an e-mail representing that the ordered components which are successfully delivered, to a predetermined address of the purchase section. Upon reception of the e-mail sent from the inspector, the purchaser of the purchase section registers the information included in the received e-mail in the ordering database 144. Specifically, the purchaser registers the delivery date, inspector (name or ID), etc. in a corresponding entry of the ordering DB 144, so that the information corresponding to the delivered components is excluded from a list of un-delivered components.

By repeatedly performing such operations, high quality products can be manufactured with using only those components which meet a predetermined level of admission criteria. In contrast to the case where components are arbitrarily selected and ordered, there is an increase in the number of each kind of components to be ordered. In such circumstances, the purchaser in the purchase section can easily go bargaining with the component provider on good grounds. Further, in contrast to the case where components are provided from a plurality of component providers, there is an increase in the total number of components to be provided from each component provider In such circumstances, the purchaser can easily go bargaining with the component provider with the good argument.

Every time improvement is made in a kind of component and the new version thereof is on sale, the old version of the kind of component will not be manufactured. If a kind of component is improved or will not be manufactured any more, the manufacture or component provider gives the admission section improvement/cessation information (update) in the form of an e-mail addressed to an e-mail address prepared mainly for receiving such information.

In the case where to inform the company that a corresponding component is not to be manufactured any more, the improvement/cessation information includes a component number, the date from which manufacture of a corresponding component is ceased, reason(s) for the cessation of manufacture of the component, a substitute, and the like. On the contrary, in the case where to inform the company that improvement is to be made in a corresponding component, the improvement/cessation information includes a component number, an improvement made in the component, a URL specifying a Web site showing the component catalogue including the improved component.

Upon reception of an e-mail including the improvement/cessation information, the person in charge in the admission section registers the received information in the improvement/cessation DB 120 (shown in FIG. 11). The person in charge in the admission section registers status information representing that the corresponding component is under examination, in the corresponding field of "Improvement/Cessation" of the admitted-component DB 119. For example, the person may change the status information of the component from "Admitted" into "Under Examination". After this, the person sets the component information of the admitted-component DB 119 to be linked to the improvement/cessation information of the improvement/cessation information.

At this time, the designer of the design section and the person in charge in the admission section can be informed that the corresponding component will be improved or the manufacture of the corresponding component will be ceased. Hence, the person in charge in the admission section can perform the selection based on the registered information.

Based on information representing a substitute and included in the improvement/cessation DB, the admission section considers what to do with those improved components or those components not be manufactured any more.

If the manufacture of a component ceased, the admission section lowers the rating of the status information of the component which is registered in the admitted-component DB 119, so as to set the component as one not to be employed in the company. For example, the admission section changes the status information of the component from "Admitted" into "Cessation". After this, the admission section determines whether to admit a substitute for the component not to be manufactured. When determined to admit a substitute, the admission section newly admits a component based on the admission criteria including the improvement/cessation information representing the substitute. Upon admission of a new component, the admission section obtains a new component ID, and registers the obtained ID in the admitted-component DB 119.

On the contrary, if a component is to be improved, the admission section determines whether to admit the component after being improved based on the admission criteria, at a right timing before the improvement is made in the component. When determined to admit the component after being improved, the admission section registers a comment to continuously employ the component. After this, the admission section updates the information registered in the admitted-component DB 119 so as to include the component information of the improved component. The admission section also updates the status information of the improvement/cessation DB 120, i.e. changes from "Non-Recommended" to "Admitted", for example.

When determined not to admit an improved component, the admission section registers a comment to cease the ordering of the component, in the improvement/cessation DB 120. After this, the admission section updates the status information registered in the admitted-component DB 119 at a desired timing. Likewise in the case where the manufacture of the component is ceased, the admission section admits a substitute for the component, as needed.

Further, if a kind of component is to be improved or not to be manufactured any more, the admission section sends an e-mail for informing about a selected substitute for the kind of component.

The design section or the manufacture section may demand to use a component which is not included in the admitted components. In this case, the demander sends an e-mail of a predetermined format to the admission section. Upon reception of the e-mail, the admission section determines whether to admit the demanded component, based on the admission criteria. When determined to admit the demanded component, the admission section registers information regarding the demanded component in the admitted-component DB.

As explained above, only desired components are admitted and registered in the DB. According to this embodiment, there is provided a system for maintaining thus formed DB, thereby to securely obtain high quality components at a low cost.

Since only desired components are admitted, some components are desirably selected from the admitted components.

Second Embodiment

In the first embodiment, the explanations have been made to the component management system for use in one single company by way of example. However, the component management system may be operated to manage the ordering of components for a plurality of companies.

Figure 20:
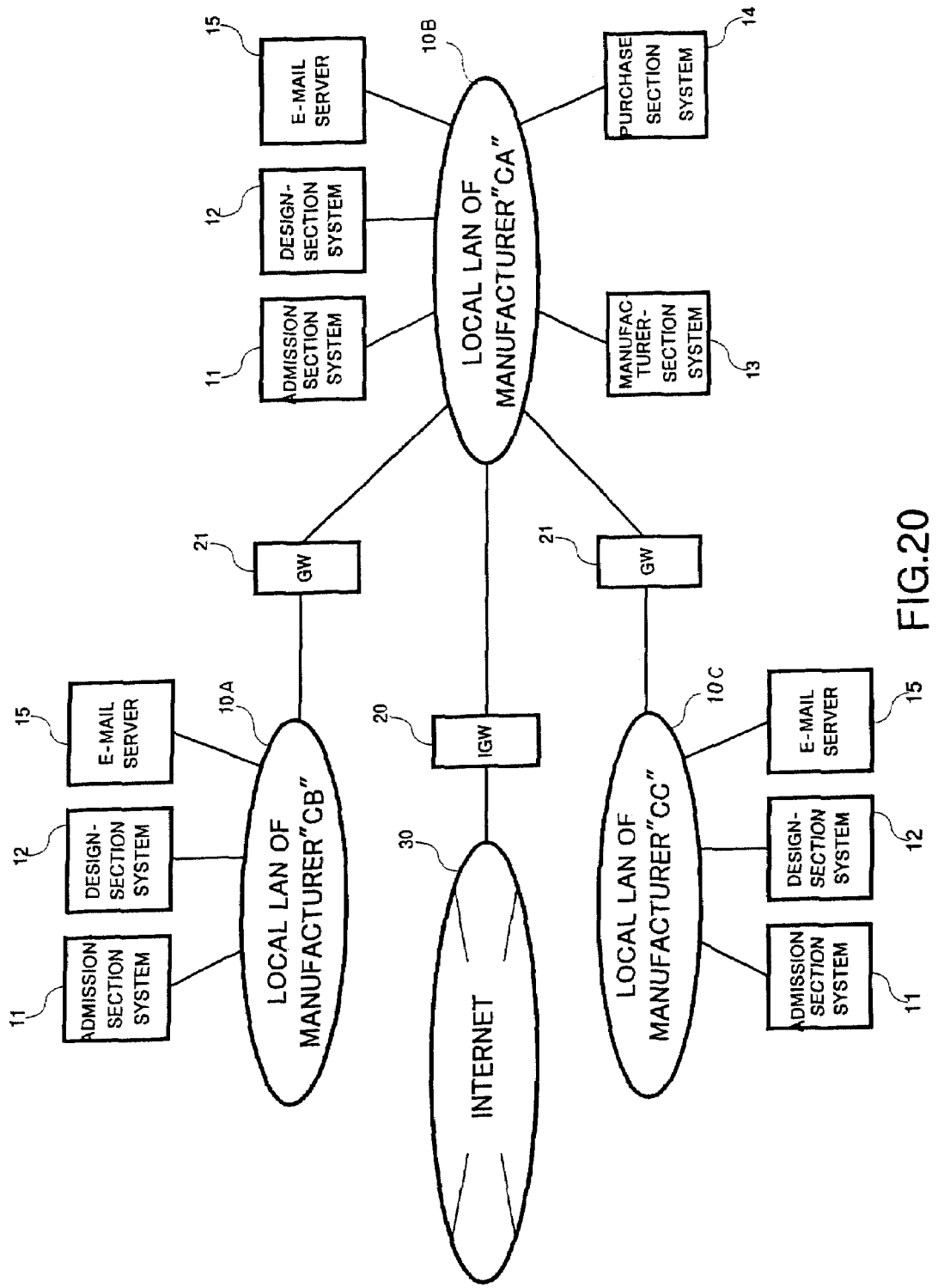
FIG. 20 is a diagram showing the structure of a component management system according to the second embodiment of the present invention.

FIG. 20 shows an example of the structure of such a system which can manage the ordering of components for a plurality of companies.

In this embodiment, suppose that the component management system is commonly used by a company CA and manufacturers CB and CC.

The company CA and manufactures CB and CC include local LANs 10A, 10B, and 10C, respectively.

The local LANs 10A, 10B, and 10C are connected with each other through gateways 21, etc.

The company CA, having the function as a head office of the manufactures CB and CC, has a component admission section, a design section, a purchase section, a manufacture section, likewise the case of the first embodiment.

On the other hand, the manufacturers CB and CC do not have the component admission section or purchase section, and have the design section and the manufacture section.

In all of the company and manufactures, the same component codes for specifying components are used.

Information regarding components are collectively acquired by the company CA. The company CA admits components, and maintain and update information regarding the admitted components, based on the acquired information.

The admission section, likewise the first embodiment, establishes a predetermined level of admission criteria, and admits components based on the criteria. Then, the admission section registers information regarding the admitted components in the admitted-component DB. The admission section collectively receives information representing whether a kind of component is improved or will not be manufactured, so as to update the improvement/cessation DB. Further, the admission section updates the admitted-component DB, in accordance with the improvement/cessation DB.

The company CA and the manufacturers CB and CC have a database for storing copies of the information contents of the admitted-component DB. The design section and the manufactured section of the company CA and the manufacturers CB and CC refer to the copies, and selects desired components.

In each of the company CA and manufacturers CB and CC is to purchase components, when a person wants to purchase a component, he/she sends a request for purchasing the component to the purchase section of the company CA, in the form of an e-mail.

The purchase section of the company CA sends an order sheet specifying the requested component and the company or manufacturer to which the ordered component should be delivered, to the component provider. Payment for the delivered component is made to the component provider by the company CA on behalf of the manufacturers CB and CC. Then, the company CA charges either of the manufactures CB and CC for the component, and the settlement is made on the account book.

Alternatively, the component provider may issue a bill for the delivered component, so that either of the manufacturers CB and CC which has ordered component directly pays for the charged bill.

In the second embodiment, likewise the first embodiment, only the desired components can be selected from a plurality of components.

According to the second embodiment, the components can be provided to and ordered collectively from the company CA and manufactures CB and CC. Hence, in contrast to the case where the components are ordered individually from the company CA and manufacturers CB and CC, there is an increase in the number of components to be ordered. Therefore, the company CA and manufacturers CB and CC can easily go bargaining with the component provider.

Third Embodiment

In the above-described second embodiment, the explanations have been made to the case where the plurality of companies collectively admit, select and purchase components to be used in the companies. If it is difficult to achieve such admission, selection and purchasing of the components between the plurality of companies, it is preferable that component admission information be used effectively between the plurality of companies, at least.

Explanations will now be made to the third embodiment of the present invention, wherein the component admission information is effectively shared between a plurality of companies.

Figure 21:
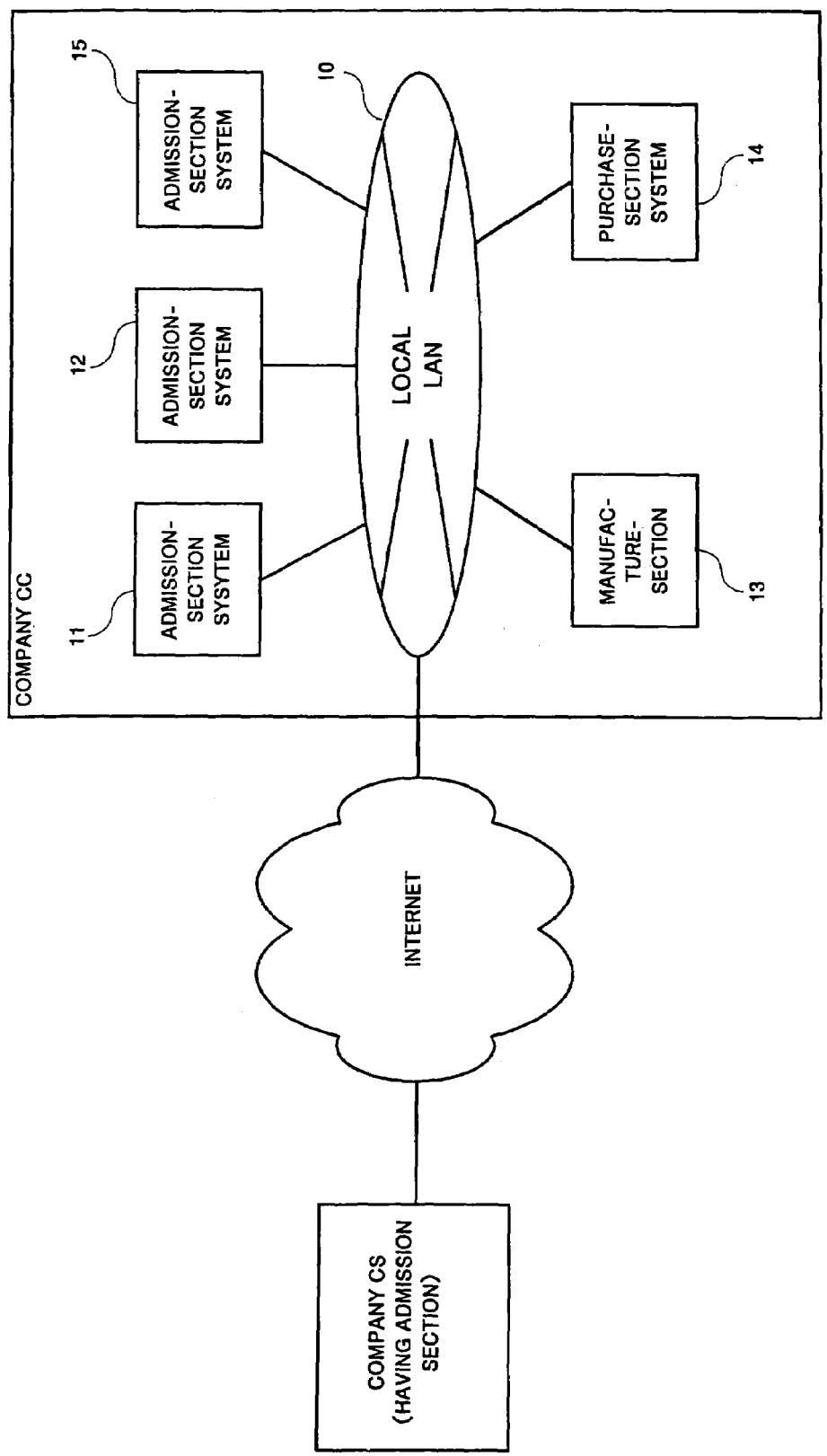
FIG. 21 is a diagram showing a component management system according to the third embodiment of the present invention.

As shown in FIG. 21, the component management system according to this embodiment includes a company CS having the component management system of the first and second embodiments and another company CC which uses component information provided from the company CS.

The company CS includes, an admission section system, a design section system, a manufacture section system, and a purchase section system, likewise the system according to the first embodiment.

The another company CC is an organization which is independent from the company CS, and includes also the admission section system 11, the design section system 12, the manufacture section system, the purchase section system 14 and the e-mail server 15, on their own.

The admission section system 11 includes an ID conversion table, and an evaluation information file.

The ID conversion table stores component numbers employed in the company CS and components number employed in the another company CC, in association with each other, as illustrated in FIG. 22.

The evaluation information file stores component information in association with each component number and evaluation information, as shown in FIG. 23.

Operations of the component management system having the structure of FIGS. 21 to 23 will now be described.

For example, as shown in FIG. 22, in the company CS, in terms of quartz oscillator, there is employed a code type which is composed of a symbol "CZ" identifying a quartz oscillator and five-digit numbers. On the other hand, in the another company CC, there is employed a code type which is composed of a symbol "E" identifying an electronic component and seven-digit numbers.

The company CS evaluates components, likewise the admission sections included in the systems of the first and second embodiments, and supplies the admission section system 11 of the another company CC with results of the evaluations through the Internet.

The admission section system 11 of the another company CC searches the ID conversion table for component numbers which are employed in the another company CC and included in the supplied information. The admission section system 11 converts the component numbers into component numbers employed in the company CS with reference to the ID conversion table, and creates a admitted-component DB, an improvement/cessation DB, an admission criterion file, a trend information file, a catalogue file, and search page file.

For information regarding any new components, an e-mail describing the new components is sent to a person in charge in the another company CC, instead of a person in charge in the company CS. Upon reception of this e-mail, the person in charge in the company CC employs new component numbers, and stores those numbers in conversion table.

Accordingly, almost the same component information as that stored in the company CS is created in the another company CC, using the component numbers employed in the another company CC.

The designer, manufacturer, purchaser of the another company CC refer to the admitted-component DB, so as to select some desired components.

In this structure, the company CC can advantageously use the system for admitting the preferable components, almost without paying for it.

Let it be assumed the design section of the company CC makes a request for employing a new component in the company. A person in charge of this in the design section sends a request for examining the new component through an e-mail or BBS (Bulletin Board System) to a component management section of the company CC.

The e-mail server 15 affixes a request number to thus sent request and stores the request, and forwards this request to the admission section of the company CS. Upon reception of this request, a person in charge of this in the company CS reviews the contents of the request, and examines the requested new component in accordance with the request.

Then, the person in charge of this in the company CS sends a result of the examination with the specified request number affixed to the result, to a particular e-mail address of the company CC. Upon reception of the e-mail addressed to the particular e-mail address, the e-mail server 15 determines the request number and the requester, and forwards the reply e-mail to the requester.

Fourth Embodiment

In the third embodiment, the explanations have exemplarily been made to the case where the company CC uses the component information as is, which is provided from the company CS. However, based on the information sent from the company CS, the company CC may build its own database regarding the components. Such a system according to the fourth embodiment of the present invention will now be described.

The structure of the system according to the fourth embodiment is substantially the same as the structure of the third embodiment which is shown in FIG. 12.

The company CS obtains component information in accordance with the company's own determination, creates recommendation information, uses such information in the company, and sends those information to the company CC, likewise the case in the first and second embodiments.

The company CC includes an admission section, and has the company's own admission criteria, etc. The admission section system 11 of the company CC has the same structure as that (FIG. 2) of the admission section system included in the component management system of the first embodiment.

A person in charge of the admission in the admission section of the company CC stores the admission criteria in the admission criteria file 115. The person also stores the trend information provided from the company CS in the trend information file 116, and the catalogue information in the catalogue file 117.

Upon reception of admission information from the company CS, the company CC once stores this information in a buffer file.

The person in the admission section of the company CC reviews the information stored in the buffer file, and stores required information and updated information in the admitted-component DB 119 or improvement/cessation DB 120.

If the designer of the company CC makes a request for examination (about the manufacturer, type of component, trend information, etc.) of the component information, this request is sent to the person in charge of the admission in the admission section. The person in charge of the admission handles the request for examination of a corresponding component, creates a written request for examination, and sends the created request to the company CS. Upon reception of the request, the company CS examines the corresponding component based on the request, and sends a result of the examination to the person in charge of this request of the company CC. The person in charge of this request in the company CC analyzes the sent result, and updates the databases 119 and 120 so as to appropriately include the information of the analyzed result.

Similarly, if the designer of the company CC makes a request for determination of whether to admit a corresponding component, this request is sent to a person in charge of component management. The person in charge of component management handles the request for determination, creates a written request for determination, and sends this request to the company CS so as to request for the determination. Upon reception of this request, the company CS creates information representing the delivery behavior of its component provider (manufacturer), quality, price, improvement/cessation information of the corresponding component, and sends the created information to the person in charge of this request in the company CC. The person in charge of this request in the company CC analyzes the sent information, and updates the databases 119 and 120 so as to adequately include the analyzed information.

According to the above structure, while using the information provided from the company CS, the company CC can build the system for admitting the components on its own.

The present invention is not limited to the above-described embodiments, and various embodiments and changes may be made thereonto without departing from the broad spirit and scope of the invention.

For example, in the above-described embodiments, the improvement/cessation information or an order for components is transmitted in the form of an e-mail. However, such information or order may be sent using any other electronic medium.

For example, various types of BBSs may be set in the admission section, and the component manufacture or component provider inputs the improvement/cessation information in the set BBS, so as to inform the ordering company about the information.

For the ordering of components, to clarify a settlement system of the company, an order application form with the sanctioner's consent may be sent to the purchase section using, what is so-called a work flow system. As this work flow system, Notes (registered trademark) provided by Novell, Inc. may be employed.

In the above-described embodiments, those components admitted by the component admission section are registered in the admitted-component DB 119. However, all the obtained information regarding components may be registered in the admitted-component DB 119. Then, based on the entire information registered therein, the components included in the information may be determined whether to be used or purchased.

The structure of the database, the table structure of the database, and the structure of a Web page are all arbitrary. For example, the admitted-component DB 119 may directly be updated based on the improvement/cessation information without using the improvement/cessation DB. In those databases, data items can arbitrarily be added in or deleted from the table.

As explained above, according to the component management system of the present invention, components can adequately be controlled and managed.

Figure 24:
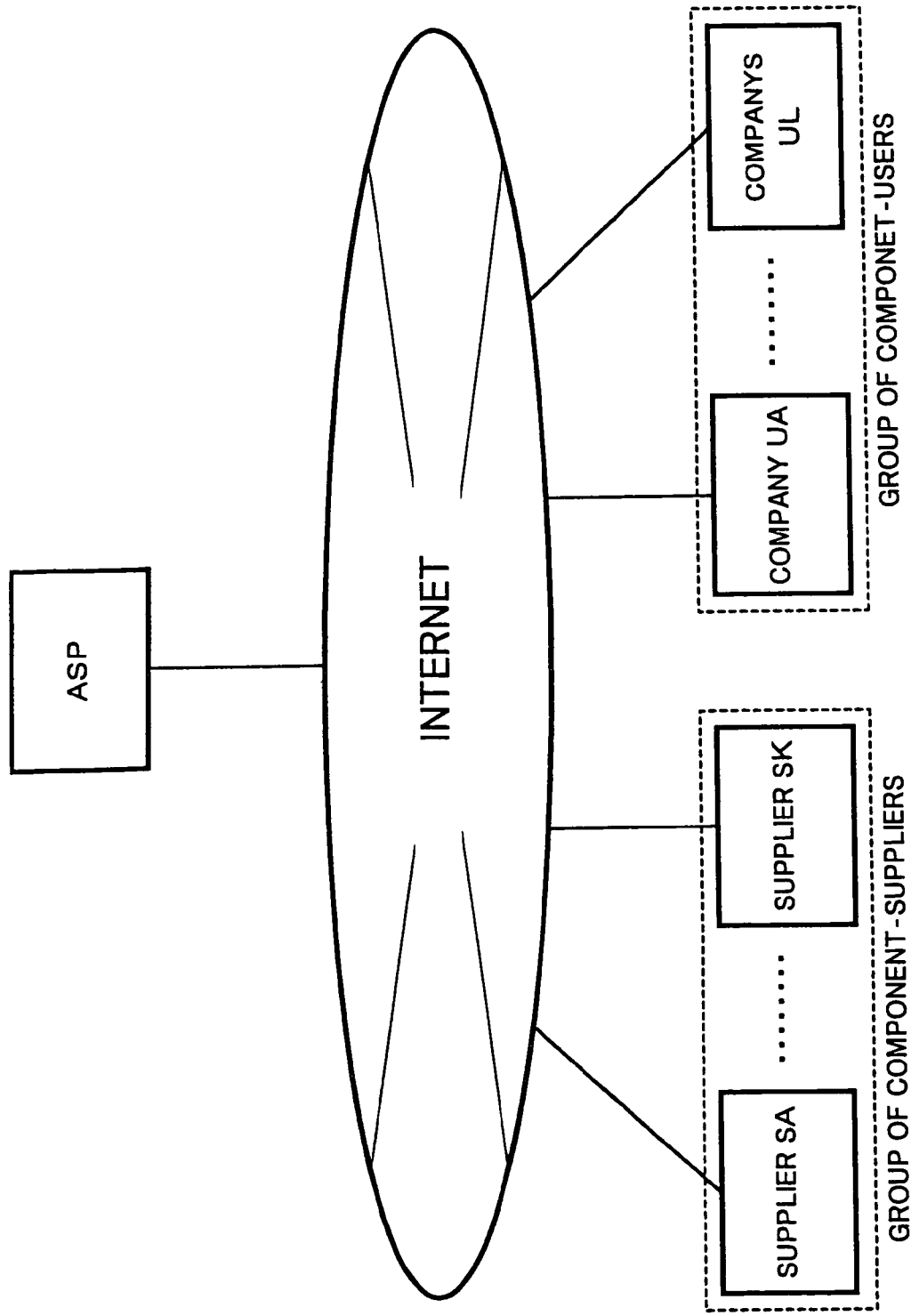
FIG. 24 is a diagram showing the structure of a component management system according to another embodiment of the present invention.

As illustrated in FIG. 24, the admission section system 11 may be an ASP (Application Service Provider). In this case, various companies can build their own component management system on the common hardware. The ASP has the system shown in FIG. 2 for each of the companies or each predetermined group of companies. In this case, the component provider (supplier) provides the ASP with the component information, instead of each individual company. The ASP specifies a user having accessed the system, using admission information, and provides the user with information corresponding to the user. The company including the admission section maintains the admitted-component DB or groups of the company's files, based on the component information stored in the ASP. In addition, in the company, the designer or those who having ordered components refer to the company's admitted-component DB, to select and order desired components. For those companies which do not have the admission section, the administrator of the ASP is a proxy for executing necessary processes corresponding to the admission section, so as to maintain the admitted-component DB.

The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2000-221549 filed on Jul. 21, 2000, and including specification, claims, drawings and summary. The disclosure of the above Japanese Patent Application is incorporated herein by reference in its entirety.

What is claimed is:

1. A component management method comprising the steps of:
    determining, using an admission apparatus, recommendation data based on characteristics of components, the recommendation data setting forth status information for the components in each of at least two different component groups, the status information indicating at least which components are preferred for use and which components are not preferred but have been admitted because they meet minimum admittance criteria;
    forming, using a database storing apparatus, a component database including the at least two different component groups, each group of component data further including component identification data identifying components in that group based on a common component characteristic, component source identification data identifying a source from which each identified component can be obtained and the recommendation data determined using the admission apparatus;
    inputting, using an input/output device, information specifying a need for a desired component sharing the common component characteristic of the components in at least one of the at least two different component groups;
    searching, using the database storing apparatus, for desired data from the component database based on the input information and the component data that includes the component identification data, component source identification data and recommendation data, the desired data identifying at least one component.

2. The component management method according to claim 1, wherein:
    the component data includes a relative rating of at least some of the components.

3. The component management method according to claim 1, wherein:
    a cessation entry is included in the component database, the cessation entry indicating if any of the components of either of the at least two different groups is no longer to be manufactured.

4. The component management method according to claim 1, wherein:
    the inputting step is done using a terminal and the desired component sharing the common component characteristic of the components in at least one of the at least two different component groups is to be used in manufacturing a product.

5. The component management method according to claim 4, wherein:

the terminal is a design terminal and the searching and retrieving steps are performed to determine a plurality of desired components as part of designing the product.

6. The component management method according to claim 4, wherein:

the terminal is a purchase terminal and the searching and retrieving steps are performed to determine a plurality of desired components to be purchased, and using the purchased plurality of desired components in manufacturing the product.

7. The component management method according to claim 6, further comprising:

placing a purchase order with the source identified by the component source identification data for at least some of the plurality of desired components that have been determined for purchase using the purchase terminal.

8. A component management system comprising:

an admission server configured to determine recommendation data based on characteristics of components, the recommendation data setting forth status information for the components in each of at least two different component groups, the status information indicating at least which components are preferred for use and which components are not preferred but have been admitted because they meet minimum admittance criteria;

a component database including the at least two different component groups, each component group further including component identification data identifying components in that group based on a common component characteristic, component source identification data identifying a source from which each identified component can be obtained and the recommendation data determined by the admission server;

an input unit configured to input information specifying a need for a desired component sharing the common component characteristic of the components in at least one of the at least two different component groups;

a search and retrieve unit configured to search for and to retrieve desired data from the component database based on the input information and the component data that includes the component identification data, component source identification data and recommendation data, the desired data identifying at least one component sharing the common component characteristic of the components of the desired component and the status information related thereto to aid selection of the component sharing the common component characteristic when more than one such common component is identified; and a display unit configured to provide an indication of recommendation along with the desired data when the at least one component identified in the desired data is determined to be preferred for use based on the recommendation data.

9. The component management system according to claim 8, wherein:

the recommendation data setting forth status information for components in each of at least two different component groups includes at least two different status levels.

10. The component management system according to claim 8, wherein:

the component data includes a relative rating of at least some of the components.

11. The component management system according to claim 8, wherein:

a cessation entry is included in the component database, the cessation entry indicating if any of the components of either of the at least two different groups is no longer to be manufactured.

12. The component management system according to claim 8, wherein:

the input unit is part of a terminal and the desired component sharing the common component characteristic of the components in at least one of the at least two different component groups is to be used in manufacturing a product.

13. The component management system according to claim 12, wherein:

the terminal is configured as a design terminal and a plurality of desired components are determined for use in manufacturing the product.

14. The component management system according to claim 12, wherein:

the terminal is configured as a purchase terminal and a plurality of desired components are determined for purchase and use in manufacturing the product.

15. The component management system according to claim 14, wherein:

the purchase terminal is further configured to place an order with the source identified by the component source identification data for at least some of the plurality of desired components that have been determined for purchase and use in manufacturing the product.

* * * * *